United States Patent [19]

Ezumi et al.

[11] Patent Number: 5,673,117
[45] Date of Patent: Sep. 30, 1997

[54] DATA COMMUNICATION APPARATUS WITH DETACHABLE NETWORK CONTROL UNIT

[75] Inventors: Yosuke Ezumi; Toshio Kenmochi; Hisashi Toyoda, all of Yokohama; Takeshi Tsukamoto, Kawasaki, all of Japan

[73] Assignee: Canon Kabushiki Kaisha, Tokyo, Japan

[21] Appl. No.: 635,785

[22] Filed: Apr. 22, 1996

Related U.S. Application Data

[63] Continuation of Ser. No. 91,010, Jul. 14, 1993, abandoned.

[30] Foreign Application Priority Data

Jul. 17, 1992 [JP] Japan .................................. 4-190948

[51] Int. Cl.$^6$ ........................................................ H04N 1/00
[52] U.S. Cl. .......................... 358/400; 358/400; 358/434; 358/442; 358/443; 358/468; 379/100
[58] Field of Search .................................... 358/400, 434, 358/468, 442, 443; 379/100

[56] References Cited

U.S. PATENT DOCUMENTS

| | | | |
|---|---|---|---|
| 5,041,918 | 8/1991 | Ishida et al. | 358/450 |
| 5,200,991 | 4/1993 | Motoyanagi | 379/100 |
| 5,224,155 | 6/1993 | Satomi et al. | 379/100 |
| 5,263,078 | 11/1993 | Takahashi et al. | 379/58 |
| 5,537,220 | 7/1996 | Ezumi et al. | 358/442 |

FOREIGN PATENT DOCUMENTS 0455157  11/1991  European Pat. Off. ......... H04N 1/32

*Primary Examiner*—Kim Vu
*Assistant Examiner*—Kimberly A. Williams
*Attorney, Agent, or Firm*—Fitzpatrick, Cella, Harper & Scinto

[57] ABSTRACT

A data communication apparatus includes connection means for electrically connecting a detachable network control unit which is an interface for connecting a communication line and control means for controlling the network control unit through the connection means.

54 Claims, 8 Drawing Sheets

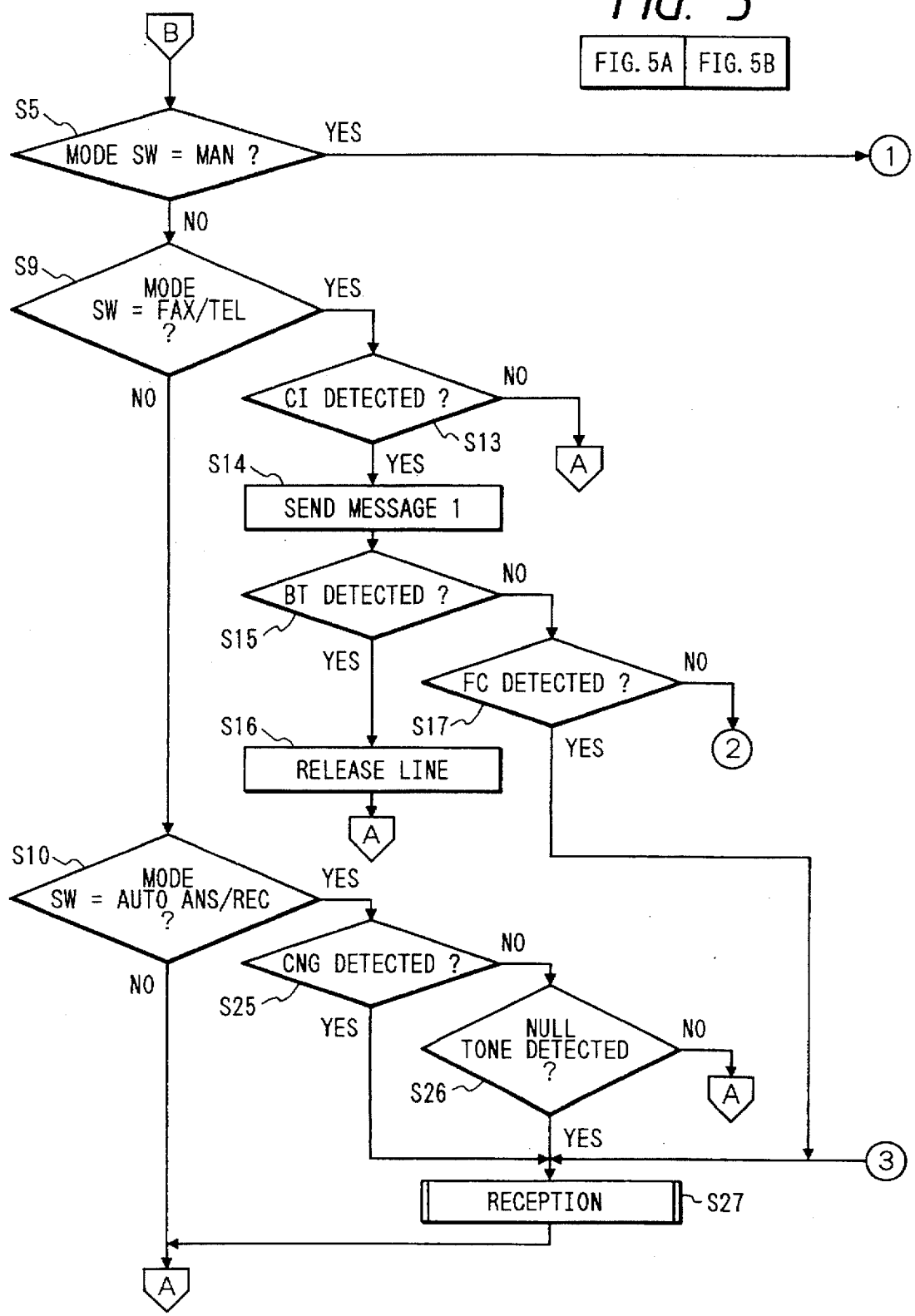

DATA COMMUNICATION APPARATUS WITH DETACHABLE NETWORK CONTROL UNIT

This application is a continuation of application No. 08/091,010 filed Jul. 14, 1993, which is now abandoned.

BACKGROUND OF THE INVENTION

1. Field of the Invention

The present invention relates to a portable facsimile apparatus having a separable NCU.

2. Related Background Art

A prior art portable facsimile apparatus has an NCU in the facsimile apparatus.

However, the prior art facsimile apparatus which has the NCU in the facsimile apparatus has the following disadvantages:

(1) An external dimension of the facsimile apparatus is large.

(2) A weight of the facsimile apparatus is heavy.

(3) Versions are different from country to country.

SUMMARY OF THE INVENTION

It is an object of the present invention to improve a portable facsimile apparatus in the light of the above.

It is an object of the present invention to provide a portable facsimile apparatus which has a separable NCU thereby reducing the size and weight of the facsimile apparatus, permits easy transportation, eliminates the need to prepare various versions from country to country and reduces a mass production cost.

DETAILED DESCRIPTION OF THE PREFERRED EMBODIMENTS

Figure 1:
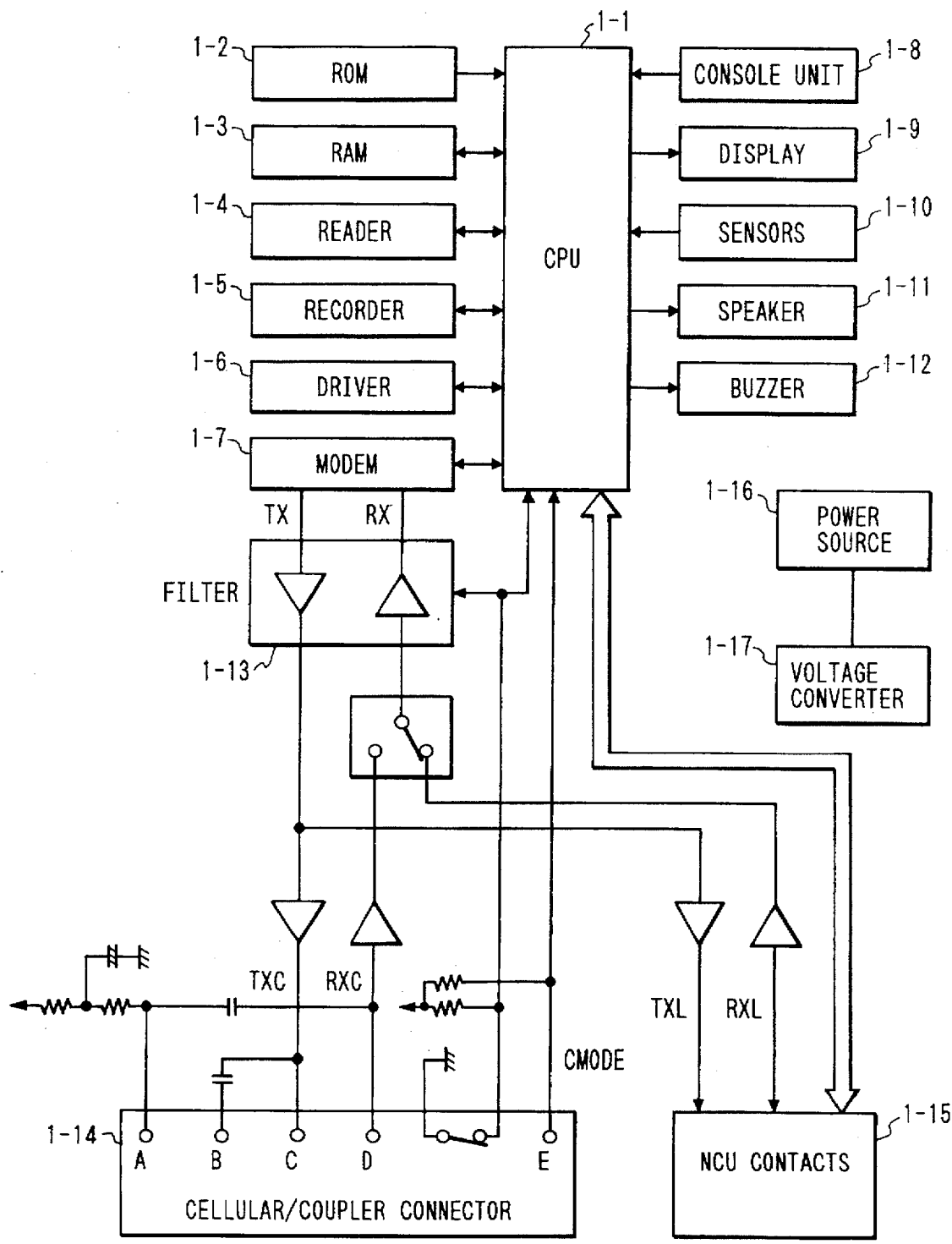
FIG. 1 shows a block diagram of a configuration of a portable facsimile apparatus in accordance with the present invention.

FIGS. 1, 2, 3, 4, 5A, 5B, 6, 7A, 7B and 7C best show features of the present invention. FIG. 1 shows a block diagram of a main unit of the present invention. CPU 1-1 controls the entire facsimile apparatus, that is, a RAM 1-3, a reader 1-4, a recorder 1-5, a driver 1-6, a modem 1-7, a console unit 1-8, a display 1-9, sensors 1-10, a speaker 1-11, a buzzer 1-12, a filter 1-13, a cellular/coupler connector 1-14 and an NCU contact 1-15.

Those units are explained below.

Figure 2:
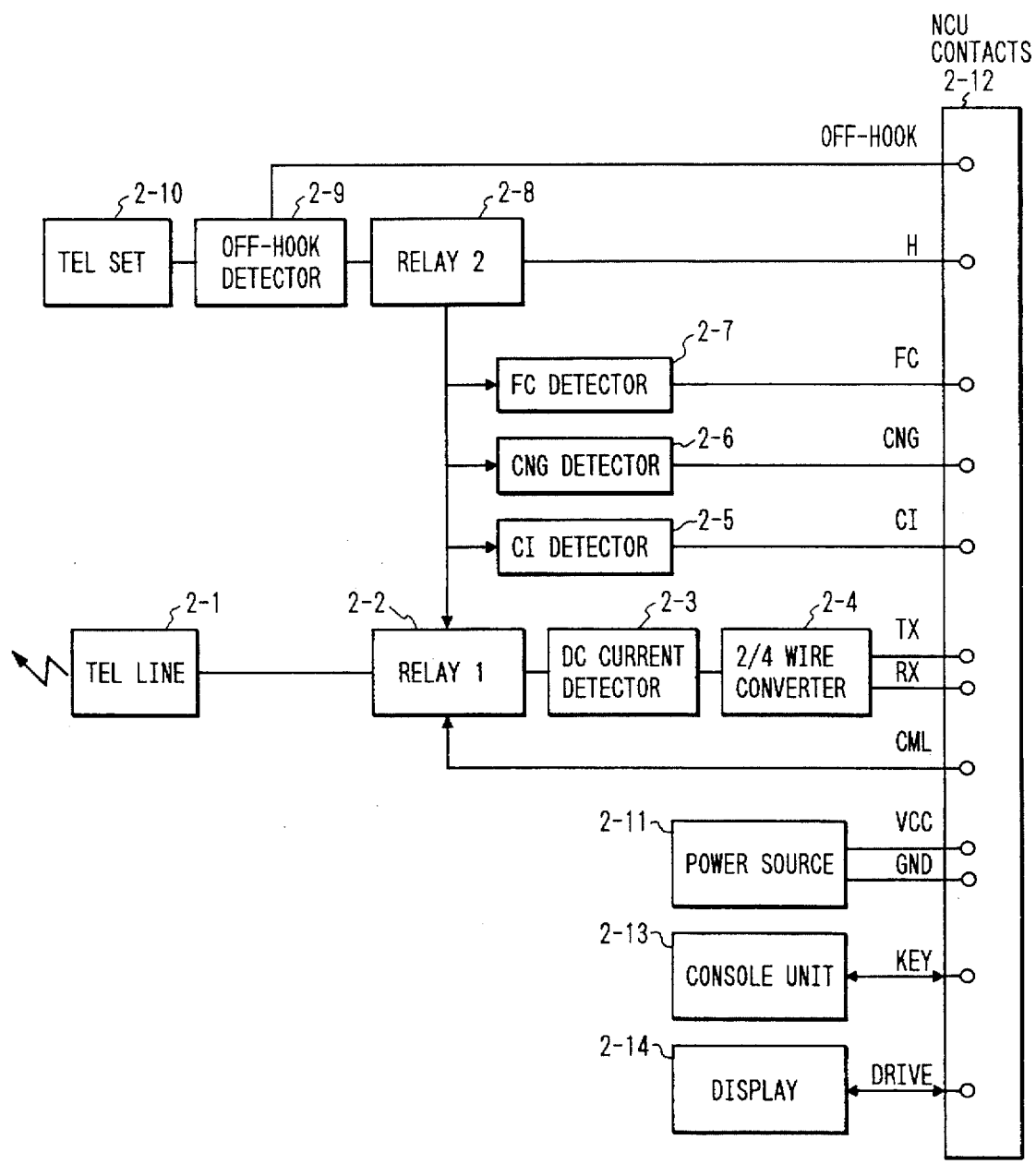
FIG. 2 shows a block diagram of an NCUBOX.

The RAM 1-3 stores binary image data read by the reader 1-4 or binary data to be recorded by the recorder 1-5, stores a signal modulated by the modem 1-7, and stores binary data outputted from a telephone line 2-1 at the NCUBOX of FIG. 2 through the NCU contact 1-15. The RAM 1-3 is further used to demodulate an analog waveform inputted from the subscriber line 2-1 through the NCUBOX of FIG. 2 and the modem 1-7 and stores the resulting binary data.

The reader 1-4 comprises a DMA controller, a CCD or a close contact type image sensor (CS), a TTL IC and a binary circuit. It binarizes the data read by using the CCD or the CS under the control of the CPU 1-1 and sends the binary data to the RAM 1-3 sequentially.

The recorder 1-5 comprises a DMA controller, a B4/A4 size thermal head and a TTL IC. It reads the record data stored in the RAM 1-3 under the control of the CPU 1—1 and prints it out as a hard copy.

The driver 1-6 comprises a stepping motor for driving feed and eject rollers of the reader 1-4 and the recorder 1-5, a gear for transmitting a driving force of the motor, and a driver circuit for controlling the motor.

The modem 1-7 comprises G3, G2, G1 and old FM modems and a clock generators connected to the modems. It modulates transmission data stored in the RAM 1-3 under the control of the CPU 1-1 and conducts communication by an analog signal from the subscriber line 2-1 or the cellular/coupler connector 1-14 through the NCUBOX of FIG. 2 and the NCU contact 1-15.

The modem 1-7 further receives the analog signal from the subscriber line 2-1 or from the cellular/coupler connector 1-14 through the NCUBOX of FIG. 2 and the NCU contact, and demodulates and binarizes it and stores the binary data in the RAM 1-3.

The console unit 1-8 comprises a start key for transmission and reception, a mode key for designating an operation mode such as fine mode and standard mode in the transmitted image, a copy key for a copy operation, an economy key for designating an energy saving mode in recording and printing when a battery power supply is used, and a stop key for stopping the operation.

The CPU 1-1 detects the depression of those keys and controls the respective units in accordance with the depression status.

The display 1-9 displays an operation status such as a communication status, a power supply status and the fine and standard modes. It comprises an LCD or LED's.

The sensors 1-10 comprises a record sheet width sensor, a record sheet presence/absence sensor, a document sheet width sensor and a document sheet presence/absence sensor. It detects the status of the document sheet and the record sheet under the control of the CPU 1-1.

The speaker 1-11 comprises a speaker and a speaker driver. It monitors a voice signal and a communication signal under the control of the CPU.

The buzzer 1-12 comprises a buzzer and a buzzer driver. It generates an alarm sound and a key touch sound under the control of the CPU.

The filter 1-13 is a low-pass filter which comprises an operational amplifier.

The cellular/coupler connected 1-14 comprises a connector with a switch and it is an analog signal interface for connecting a mobile communication terminal and an acoustic coupler. Whether a plug is inserted in a jack terminal or not is monitored by the CPU by a JACK signal and a transmission level is changed under the control of the CPU and the reception signal is selectively received from the NCU connector or the cellular/coupler connector. By applying a CMODE signal of the cellular/coupler connector to the CPU, the mobile terminal and the acoustic coupler are discriminated and the transmission level or the reception level can be switched accordingly.

The NCU connector 1-15 is an interface for inputting and outputting signals and supplying powers as the contacts of the main unit and it has the following input/output signal lines.

Input of a power supply Vcc;

GND;

TX which outputs a transmission signal TX from a modem in the main body;

RX which inputs a reception signal RX from the NCUBOX of FIG. 2;

CML which outputs a control signal of a relay 1 of FIG. 2 from the CPU of the main unit;

H which outputs a control signal of the relay 2 of FIG. 2 from the CPU of the main unit;

CNG which inputs a CNG control signal from a CNG detector 2-6 of the NCUBOX of FIG. 2;

CI which inputs a CI control signal from the CI detector 2-5 of the NCUBOX of FIG. 2;

FC which inputs an FC control signal from an FC detector 2-7 of the NCUBOX of FIG. 2;

OFF-HOOK which inputs an OFF-HOOK control signal from an off-hook detector 2-9 of the NCUBOX of FIG. 2;

KEY which is applied to the CPU of the main unit from the console unit 2-13; and DRIVE which controls the LED's of the display 2-14 by from the CPU of the main unit;

The power source 1-16 supplies powers to the respective units. It uses one of the three configurations shown in FIG. 7 and outputs a DC power of +12 volts.

The power source 7-1 comprises a battery 7-2 of DC +12 volts and it supplies powers of DC +12 volts to the respective units.

The power source 7-3 comprises an AC adaptor 7-4 which converts an AC power input to DC +12 volts and it supplies powers of DC +12 volts to the respective units.

The power source 7-5 comprises a car battery adapter 7-6 which receives a DC power from a carmounted battery and converts it to stabilized DC +12 volts and it supplies powers of DC +12 volts to the respective units.

The voltage converter 1-17 comprises a series regulator or a switching regulator and a DC/DC converter and it converts DC +12 volts supplied from the power source 1-16 to DC +5 volts.

FIG. 2 shows a block diagram of a configuration of the NCUBOX of the present invention. It is connected to the NCU connector 1-15 of the main unit.

The telephone line 2-1 is a subscriber line connected to the NCUBOX.

Relay 1 (2-2) selectively connect the telephone line 2-1 to the modem 1-7 in the main unit or a sub-telephone connector 2-10 under the control of the CPU 1-1.

A DC current detector 2-3 captures a DC voltage on the telephone line.

A 2/4 wire converter 2-4 comprises a hybrid transformer and converts between two wires and four wires.

A CI detector 2-5 separates a call control signal (CI signal) applied from the telephone line 2-1, between a primary winding and a secondary winding by using a photo-coupler and passes only an AC signal component.

A CNG detector 2-6 separates a CNG control signal defined by T-30 of a protocol signal in a facsimile communication between the primary winding and the secondary winding when the telephone line is connected to the sub-telephone by the relay 1 and passes only an AC signal component.

An FC detector 2-7 detects a non-ringing call signal (a call signal sent from an F-network which is a service network of NTT Corp., at 1300 Hz) by a frequency counter and detects an FC signal which is the detection signal by a PLL circuit, for example.

An off-hook detector 2-9 detects the off-hook of a telephone set connected to the sub-telephone connector 2-10. When the relay 1 connects the subscriber line and the modem, it forms a quasi-DC loop in the telephone set connected to the sub-telephone connector 2-10 to detect a current. In order to separate the quasi-DC loop from the subscriber line, relay 2 (2-8) is provided to control it by an H control of the CPU.

A sub-telephone connector 2-10 is a sub-telephone connector terminal connected to the NCUBOX.

A power source 2-11 supplies powers to the main unit of FIG. 1 through the NCU contact.

The NCU contact 2-12 is an interface which inputs and outputs signals through the contact of the NCUBOX and supplies powers. It has the following input/output signal lines.

Input of a power supply Vcc;

GND;

TX which outputs a transmission signal TX from a modem in the main body;

RX which inputs a reception signal RX from the NCUBOX of FIG. 2;

CML which outputs a control signal of a relay 1 of FIG. 2 from the CPU of the main unit;

H which outputs a control signal of the relay 2 of FIG. 2 from the CPU of the main unit;

CNG which inputs a CNG control signal from a CNG detector 2-6 of the NCUBOX of FIG. 2;

CI which inputs a CI control signal from the CI detector 2-5 of the NCUBOX of FIG. 2;

FC which inputs an FC control signal from an FC detector 2-7 of the NCUBOX of FIG. 2;

OFF-HOOK which inputs an OFF-HOOK control signal from an off-hook detector 2-9 of the NCUBOX of FIG. 2;

KEY which is applied to the CPU of the main unit from the console unit 2-13; and DRIVE which controls the LED's of the display 2-14 by from the CPU of the main unit.

A console unit 2-13 comprises a mode key for designating a reception mode. The CPU 1-1 detects the depression of the key and controls the respective units in accordance with the depression status.

A display 2-14 comprises LED's for displaying the reception mode and displays the status by the signal from the CPU 1-1.

Figure 3:
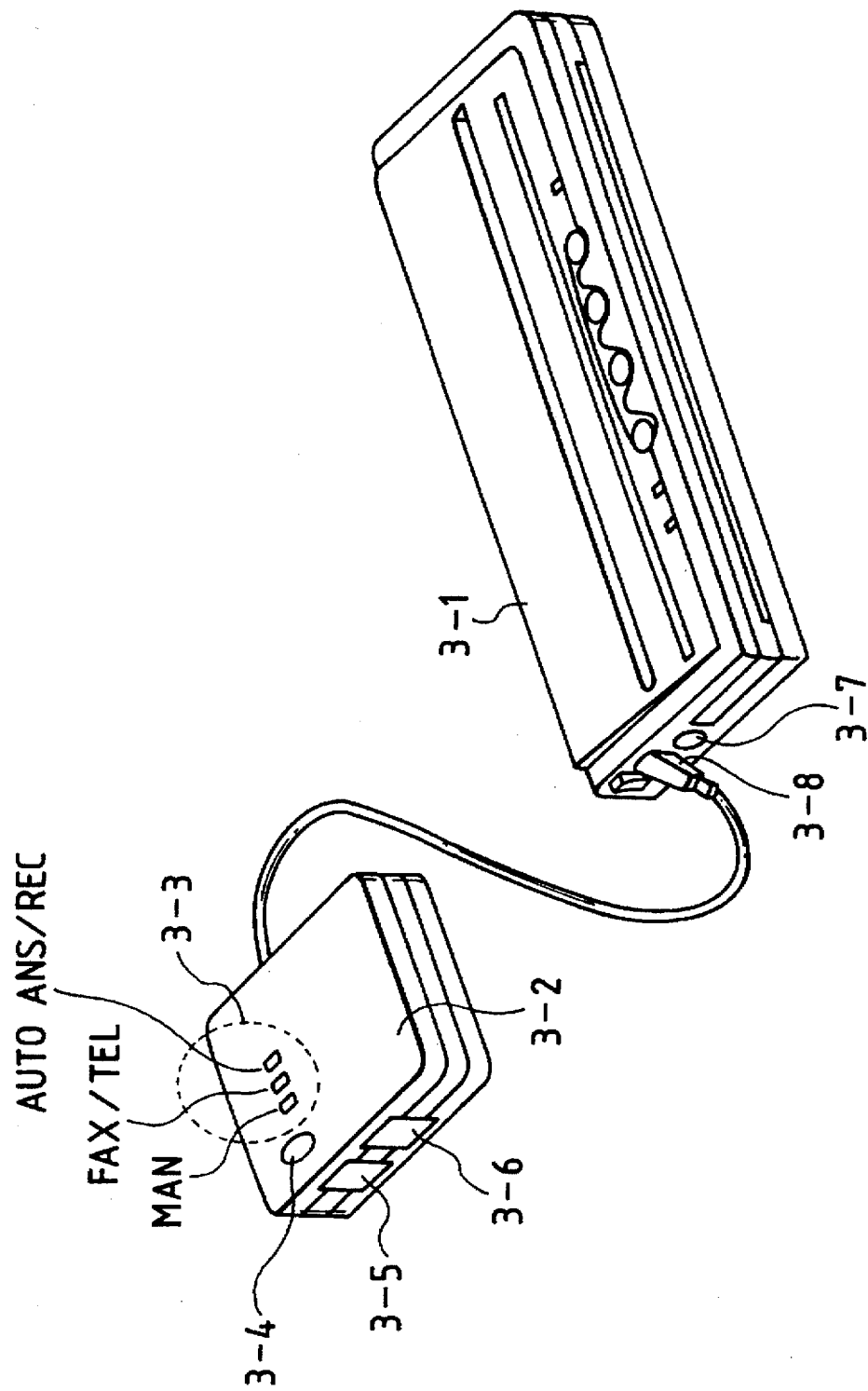
FIG. 3 shows an external views of the embodiment.

FIG. 3 shows an outer view of the present invention. Numeral 3-1 denotes a facsimile main unit in a transport mode and has a configuration shown in FIG. 1.

Numeral 3-2 denotes the NCUBOX used when it is connected to the subscriber line and has a configuration shown in the block diagram of FIG. 2.

Numeral 3-3 denotes a display for displaying the reception mode.

Numeral 3-4 denotes a console unit for switching a communication mode.

Numeral 3-5 denotes a terminal for the sub-telephone connector.

Numeral 3-6 denotes a terminal for connecting the subscriber line.

Numeral 3-7 denotes a terminal for connecting the mobile terminal and the acoustic coupler.

Numeral 3-8 denotes a terminal for connecting the NCUBOX 3-2.

Figure 4:
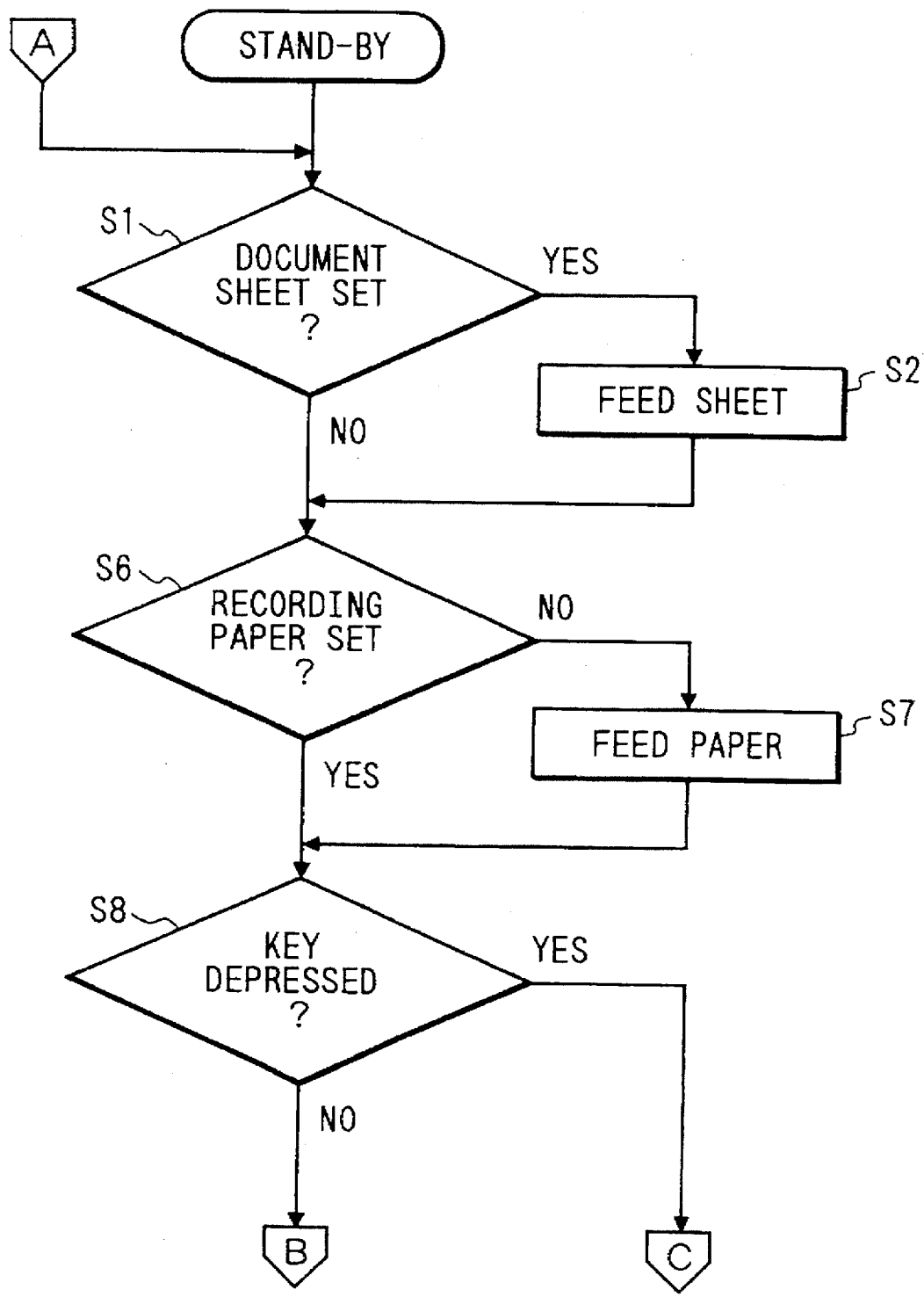
FIG. 4 shows a flow chart of a facsimile operation of the embodiment.
Figure 5B:
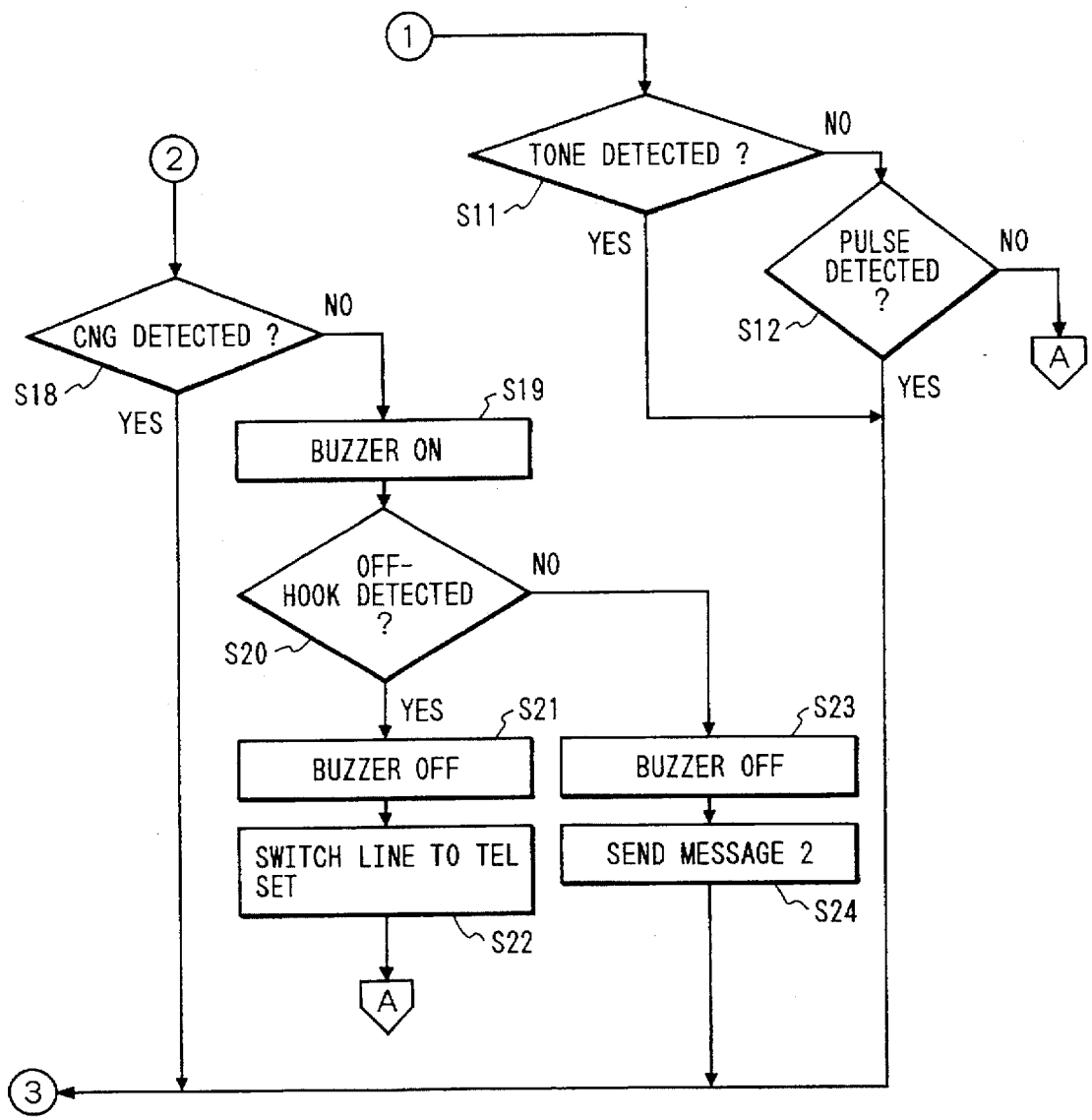
FIG. 5 is comprised of FIGS. 5A and 5B showing flow charts of a facsimile operation of the embodiment.

An operation of the above configuration is now explained in detail with reference to flow chart of FIGS. 4 to 6. This procedure is stored in the ROM 1-2 as a program of the CPU 1-1.

First, after the power-on, a stand-by mode is initiated. In a step S1, the loading of a document sheet is determined by checking the presence or absence of the document sheet. If the document sheet has been loaded, the document sheet is fed in a step S2 and the process proceeds to a step S6.

If the document sheet has not been loaded, the process proceeds to the step S6.

In the step S6, whether a record sheet has been loaded or not is determined by checking the presence or absence of the record sheet. If the record sheet has been loaded, the record sheet is fed in a step S7 and the process proceeds to a step S8.

If the record sheet has not been loaded, the process proceeds to the step S8.

In the step S8, whether any key of the console unit 1-8 has been depressed or not is determined. If the key has been depressed, a key operation of a flow C is initiated.

If none of the keys has been depressed, a flow B is initiated and in a step S3 (not shown), the FC signal of 1300 Hz is detected by the CPU of the main unit, by the FC signal of the FC detector of the NCUBOX, through the contact. If it is detected, a reception mode of a step S27 is initiated. If the FC signal is not detected, whether the mode switch is in a manual mode or not is determined in a step S5, and if it is in the manual mode, a tone signal or a pulse signal which is sent to switch the telephone set to the facsimile apparatus is detected in steps S11 and S12. The tone signal is detected by the modem in the main unit through RX of the contact and the pulse signal is detected by the CPU of the main unit through OFF-HOOK of the contact.

If none of the signals is detected, the process returns to a stand-by state, and if any of the signals is detected, the CML relay of the NCUBOX is switched from an externally connected telephone set to the facsimile apparatus through the contact by the CML signal from the CPU of the main unit to initiate the reception mode of the step S27.

In the step S5, if the mode switch is not in the manual mode, whether the mode switch is in a FAX/TEL automatic switching mode or not is determined in a step S9, and if it is in the FAX/TEL automatic switching mode, the CI signal is detected in a step S13 by the CPU of the main unit by the signal from the CI detector of the NCUBOX. If the CI signal is not detected, the process returns to the stand-by state, and if it is detected, a voice message 1 "Now calling. Please wait for a while." is sent out in a step S14 from the modem 1-7 of the main unit through TX of the NCUBOX, and in a step S-15, a busy tone BT signal is detected by the modem of the main unit. When the BT signal is detected, the line is released in a step S16 and the process returns to the stand-by state. If the BT signal is not detected in step S16, the process moves to step S17 to try to detect the FC signal. If the FC signal is not detected in step S17, the process moves to step S18 to try to detect the CNG signal of 1100 Hz by the modem of the main unit. If any of the signals is detected, the reception mode of the step S27 is initiated, and if none of the signals is detected, a buzzer sound is generated in a step S19 to inform that a destination is a telephone set.

After the buzzer sound has been generated, the OFF-HOOK signal is detected to determine if a handset has been hooked off or not in a step S20. If it is detected, the buzzer sound is stopped in a step S21 and the line is switched to the sub-telephone in a step S22. Then, the process returns to the stand-by mode.

If the OFF-HOOK signal is not detected, the buzzer sound is stopped in a step S23 and a voice message "Call was made but nobody is around there. If you are sending via facsimile, please send it," is sent out from the modem 1-7 through TX of the contact in a step S24, and in a step S27 the reception mode is started.

In the step S9, if the mode switch is not in the FAX/TEL automatic switching mode, whether the mode switch is in an automatic answering and recording telephone connection mode or not is determined in a step S10. If it is not, the process returns to the stand-by status. If it is in the automatic answering and recording telephone connection mode, the CNG signal is detected in a step S25, and if it is detected, the reception mode is started in a step S27.

If the CNG signal is not detected, whether the destination is soundless or not is determined in a step S26. If it is soundless, the reception mode is started in the step S27, and if not, the process returns to the stand-by status.

An operation flow C is now explained with reference to figure.

In a step S40, whether a copy key has been depressed or not is determined, and if it has been depressed, the copy mode is started in a step S46.

If the copy key has not been depressed, whether a start key has been depressed or not is determined in a step S41.

If the start key has been depressed, the presence or absence of a document sheet is determined in a step S47. If the document sheet is present, the same operation as that of the prior art facsimile manual transmission is conducted in a step S49.

If the document sheet is not present, the reception mode is started in a step S48.

In the step S41, if the start key has not been depressed, whether a transmission mode key has been depressed or not is determined in a step S42. If it has been depressed, the transmission mode is set to either fine or standard in a step S50.

If the transmission key has not been depressed, whether an economy key has been depressed or not is determined in a step S43. If it has been depressed, an economy mode in which thin (or intermittent) printing is made is set in a step S51.

If the economy key has not been depressed, whether a reception mode key has been depressed or not is determined by a KEY signal of the contact to the NCUBOX in a step S44. If it has been depressed, the reception mode is set to one of manual, FAX/TEL switching and automatic responding and recording telephone connection in a step S52 and display the selected mode by an LED on the display of the NCUBOX by a DRIVE signal.

If the reception mode key has not been depressed, whether a stop key has been depressed or not is determined in a step S45. If it has been depressed, the operation is immediately stopped in a step S53 and the process returns to the stand-by status.

If the stop key has not been depressed, that is, if none of the keys has been depressed, the process returns to the stand-by status.

In accordance with the present invention, since the NCU is separable from the main unit, the dimension and the weight of the main unit are reduced. Further, in Europe, the main unit has many versions from country to country but the main unit may be uniform by the separation of the NCU.

What is claimed is:

1. A data communication apparatus arranged in a first housing, comprising:
    connection means for electrically connecting an external network control unit which is an interface for connecting a communication line, the network control unit being detachable to said data communication apparatus and being arranged in a second housing different from the first housing of said data communication apparatus; and
    control means for controlling the network control unit through said connection means, said control means being arranged in said first housing.

2. A data communication apparatus according to claim 1 further comprising a connecter for connecting a mobile communication terminal so as to perform a communication operation through the mobile communication terminal.

3. A data communication apparatus according to claim 1 wherein the network control unit has a power supply, wherein power is supplied from said power supply to said data communication apparatus.

4. A data communication apparatus according to claim 1 wherein the network control unit has a console unit for selecting an operation mode, and said control means discriminates the operation mode selected by said console unit through said connecting means.

5. A data communication apparatus according to claim 1 wherein the network control unit has a display which displays under the control of said control means.

6. A data communication apparatus according to claim 1 wherein the network control unit has call detection means for outputting the detection of a call to said control means in response to the call.

7. A data communication apparatus according to claim 1 wherein the network control unit has CNG signal detection means for outputting the detection of a CNG signal to said control means when the CNG signal is detected.

8. An apparatus according to claim 1, wherein said second housing includes a connection terminal for a subscriber line, and said network control unit controls connection of the subscriber line.

9. An apparatus according to claim 8, wherein said second housing further includes a connection terminal for a telephone.

10. A data communication apparatus arranged in a first housing, comprising:
    first connection means for electrically connecting an external network control unit which is an interface for connecting communication line, the network control unit being detachable to said data communication apparatus and being arranged in a second housing different from the first housing of said data communication apparatus;
    second connection means for connecting a mobile communication terminal; and
    control means for controlling the network control unit through said first connection means, said control means being arranged in said first housing.

11. A data communication apparatus according to claim 10 further comprising switching means for switching between said first connection means and said second connection means.

12. A data communication apparatus according to claim 10 wherein the network control unit has a power supply, wherein power is supplied from said power supply to said data communication apparatus.

13. A data communication apparatus according to claim 10 wherein the network control unit has a console unit for selecting an operation mode, and said control means discriminates the operation mode selected by said console unit through said first connection means.

14. A data communication apparatus according to claim 10 wherein the network control unit has a display which displays under the control of said control means.

15. An apparatus according to claim 10, wherein said second housing includes a connection terminal for a subscriber line, and said network control unit controls connection of the subscriber line.

16. An apparatus according to claim 15, wherein said second housing further includes a connection terminal for a telephone.

17. A data communication system comprising:
    an external network control unit for connecting a communication line, said network control unit being detachable to a main body arranged in a first housing, said network control unit further being arranged in a second housing different from the first housing of the main body, the main body including:
    (1) connection means for electrically connecting said network control unit; and
    (2) control means for controlling said network control unit through said connection means, said control means being arranged in said first housing.

18. A data communication system according to claim 17, wherein the main body further includes second connection means for connecting a mobile communication terminal so as to perform a communication operation through the mobile communication terminal.

19. A data communication system according to claim 17, wherein said network control unit includes call detection means for detecting a call from the communication line and outputting a detection signal to the main body, and, wherein said control means controls a communication operation in accordance with the detection signal.

20. A system according to claim 17, wherein said second housing includes a connection terminal for a subscriber line, and said network control unit controls connection of the subscriber line.

21. A system according to claim 20, wherein said second housing further includes a connection terminal for a telephone.

22. A data communication apparatus arranged in a first housing, comprising:
    a connector for electrically connecting an external network control unit which is an interface for connecting a communication line, the network control unit being detachable to said data communication apparatus and being arranged in a second housing different from the first housing of said data communication apparatus; and
    a controller for controlling the network control unit through said connector, said controller being arranged in said first housing.

23. A data communication apparatus according to claim 22, further comprising a second connector for connecting a mobile communication terminal so as to perform a communication operation through the mobile communication terminal.

24. A data communication apparatus according to claim 22, wherein the network control unit has a power supply, and wherein power is supplied from said power supply to said data communication apparatus.

25. A data communication apparatus according to claim 22, wherein the network control unit has a console unit for selecting an operation mode, and said controller discriminates the operation mode selected by said console unit through said connector.

26. A data communication apparatus according to claim 22, wherein the network control unit has a display which displays under the control of said controller.

27. A data communication apparatus according to claim 22, wherein the network control unit has a call detector for outputting the detection of a call to said controller in response to the call.

28. A data communication apparatus according to claim 22, wherein the network control unit has a CNG signal detector for outputting the detection of a CNG signal to said controller when the CNG signal is detected.

29. An apparatus according to claim 22, wherein said second housing includes a connection terminal for a subscriber line, and said network control unit controls connection of the subscriber line.

30. An apparatus according to claim 29, wherein said second housing further includes a connection terminal for a telephone.

31. A data communication apparatus arranged in a first housing, comprising:
a first connector for electrically connecting an external network control unit which is an interface for connecting communication line, the network control unit being detachable to said data communication apparatus and being arranged in a second housing different from the first housing of said data communication apparatus;
a second connector for connecting a mobile communication terminal; and
a controller for controlling the network control unit through said first connector, said controller being arranged in said first housing.

32. A data communication apparatus according to claim 31, further comprising a switch for switching between said first connector and said second connector.

33. A data communication apparatus according to claim 31, wherein the network control unit has a power supply, and wherein power is supplied from said power supply to said data communication apparatus.

34. A data communication apparatus according to claim 31, wherein the network control unit has a console unit for selecting an operation mode, and said controller discriminates the operation mode selected by said console unit through said connector.

35. A data communication apparatus according to claim 31, wherein the network control unit has a display which displays under the control of said controller.

36. An apparatus according to claim 31, wherein said second housing includes a connection terminal for a subscriber line, and said network control unit controls connection of the subscriber line.

37. An apparatus according to claim 36, wherein said second housing further includes a connection terminal for a telephone.

38. A data communication system comprising:
an external network control unit for connecting a communication line, said network control unit being detachable to a main body arranged in a first housing, said network control unit further being arranged in a second housing different from the first housing of the main body, the main body including:
(1) a connector for electrically connecting said network control unit; and
(2) a controller for controlling said network control unit through said connector, said controller being arranged in said first housing.

39. A data communication system according to claim 38, wherein the main body further includes a second connector for connecting a mobile communication terminal so as to perform a communication operation through the mobile communication terminal.

40. A data communication system according to claim 38, wherein said network control unit includes call a detector for detecting a call from the communication line and outputting a detection signal to the main body, and wherein said controller controls a communication operation in accordance with the detection signal.

41. A system according to claim 38, wherein said second housing includes a connection terminal for a subscriber line, and said network control unit controls connection of the subscriber line.

42. A system according to claim 41, wherein said second housing further includes a connection terminal for a telephone.

43. A data communication apparatus arranged in a first housing, comprising:
a modem; and
a connection for connecting a network control unit which is an interface for connecting a subscriber line, the network control unit being detachable to said data communication apparatus and being arranged in a second housing different from said first housing,
wherein said data communication apparatus does not have the network control unit in said first housing, and the second housing does not have said modem.

44. An apparatus according to claim 43, wherein the network control unit has a power supply and wherein power is supplied from the power supply to said data communication apparatus.

45. An apparatus according to claim 43, further comprising a controller arranged in said first housing for controlling the network control unit through said connector.

46. An apparatus according to claim 45, wherein said network control unit has a console unit for selecting an operation mode, and said controller discriminates the operation mode selected by said console unit through said connector.

47. An apparatus according to claim 45, wherein said network control unit has a display which displays under the control of said controller.

48. An apparatus according to claim 45, wherein said network control unit has a call detector for outputting the detection of a call to said controller in response to the call.

49. An apparatus according to claim 45, wherein said network control unit has a CNG signal detector for outputting the detection of a CNG signal to said controller when the CNG signal is detected.

50. An apparatus according to claim 43, further comprising a second connector for connecting a mobile communication terminal.

51. A data communication system comprising:

a modem arranged a first housing; and a network control unit for connection a subscriber line, said network control unit being detachable to said modem arranged in said first housing, said network control unit further being arranged in a second housing different from said first housing, said first housing including a connector for connecting said network control unit to said modem, wherein said first housing does not include said network control unit, and said second housing does not include said modem.

52. A system according to claim 51, wherein said first housing further includes a controller for controlling said network control unit through said connector.

53. A system according to claim 51, wherein said first housing further includes a second connector for connecting a mobile communication terminal so as to perform a communication operation through the mobile communication terminal.

54. A system according to claim 52, wherein said network control unit includes a call detector for detecting a call from the subscriber line and outputting a detection signal to said controller, and wherein said controller controls a communication operation in accordance with the detection signal.

* * * * *

UNITED STATES PATENT AND TRADEMARK OFFICE
CERTIFICATE OF CORRECTION

PATENT NO. : 5,673,117

DATED : September 30, 1997

INVENTOR(S): YOSUKE EZUMI ET AL.

It is certified that error appears in the above-identified patent and that said Letters Patent is hereby corrected as shown below:

COLUMN 1
 Line 30, "NCU" should read --NCU,--;
 Line 32, "apparatus," should read --apparatus, which--;
 Line 41, "an external views" should read --an external view--.

COLUMN 2
 Line 20, "a clock generators" should read --a clock generator--;
 Line 44, "comprises" should read --comprise--.

COLUMN 3
 Line 4, "powers as the contacts" should read --power to the contacts--;
 Line 30, delete "by";

Line 32, "powers" should read --power--;
 Line 36, "powers" should read --power--;
 Line 40, "powers" should read --power--;
 Line 42, "carmounted" should read --car-mounted--;
 Line 43, "powers" should read --power--;
 Line 54, "Relay" should read --Relays--; and "(2-2)" should read --(2-2) and 2(2-8)--;
 Line 62, "2-1," should read --2-1--.

COLUMN 4
 Line 19, "powers" should read --power--;
 Line 23, "powers" should read --power--;
 Line 25, "supply" should read --source--;
 Line 47, delete "by";

UNITED STATES PATENT AND TRADEMARK OFFICE
CERTIFICATE OF CORRECTION

PATENT NO. : 5,673,117

DATED : September 30, 1997

INVENTOR(S): YOSUKE EZUMI ET AL.

It is certified that error appears in the above-identified patent and that said Letters Patent is hereby corrected as shown below:

COLUMN 5
Line 8, "chart" should read --charts--.

Figure 6:
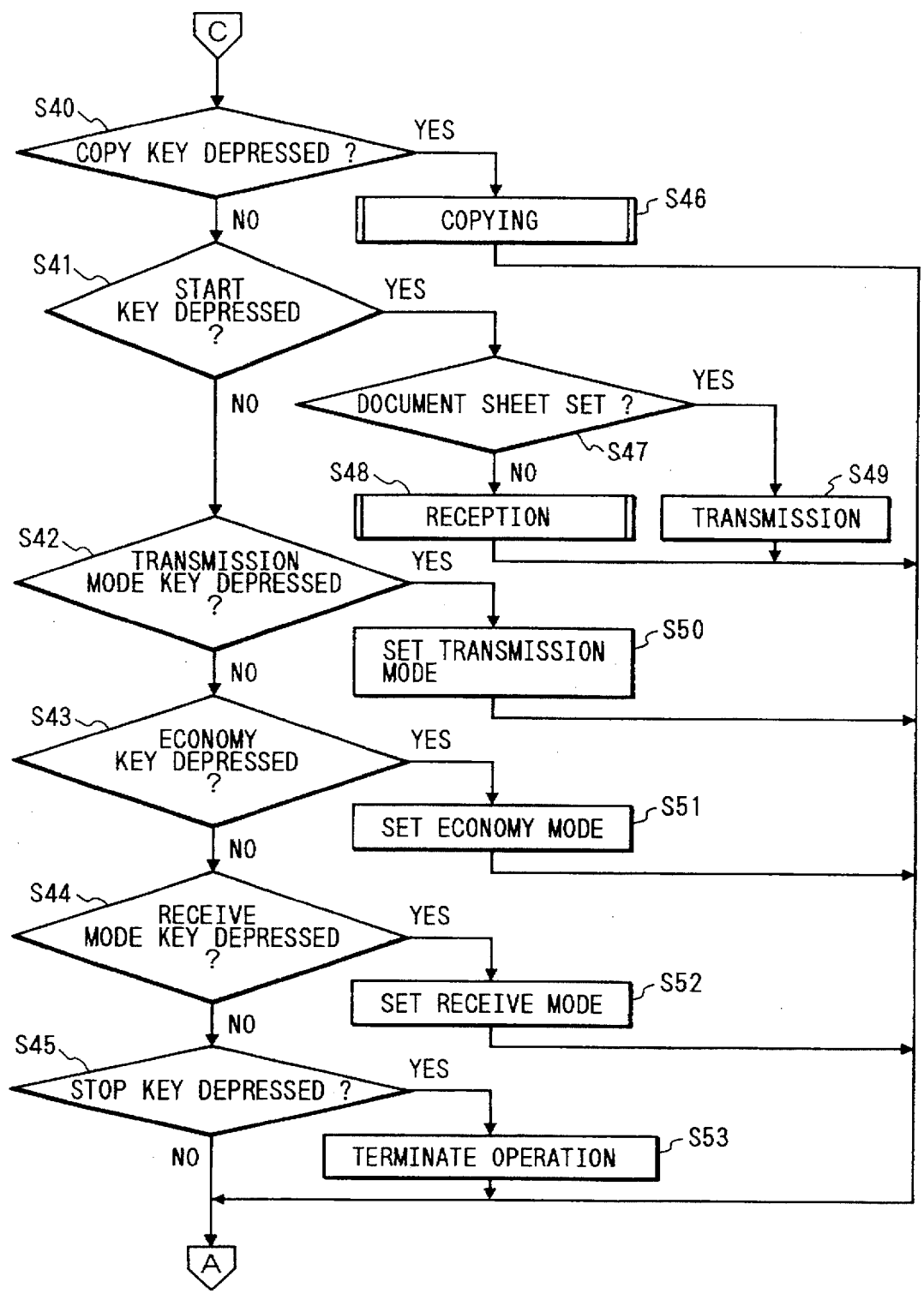
FIG. 6 shows a flow chart of a facsimile operation of the embodiment.
Figure 7A:
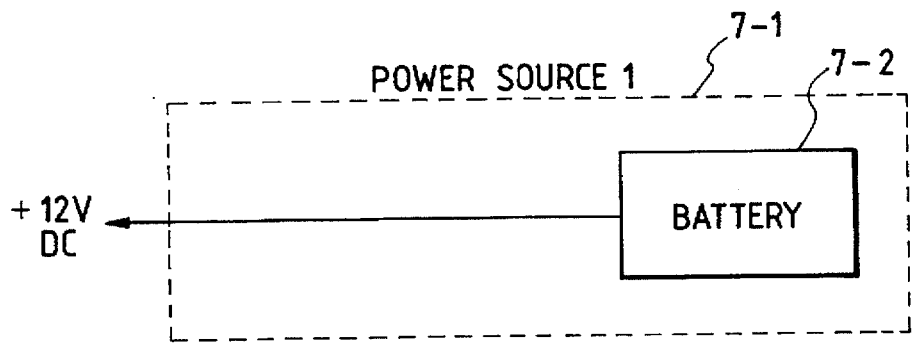
FIG. 7A to 7C show block diagrams of a configuration of a power supply.
Figure 7B:
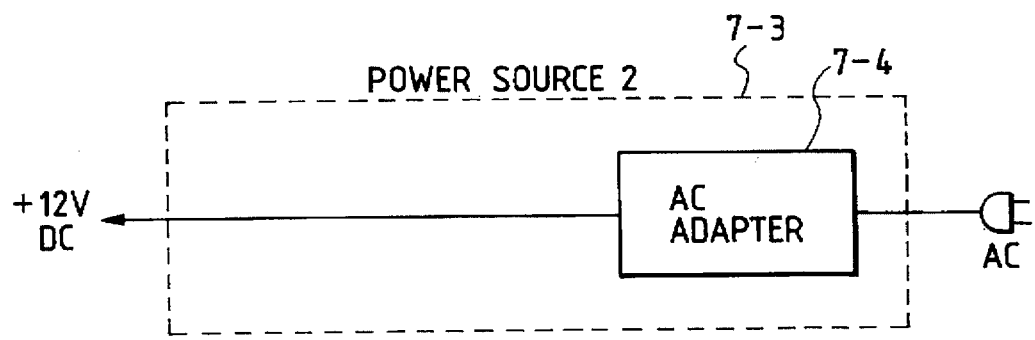
Figure 7C:
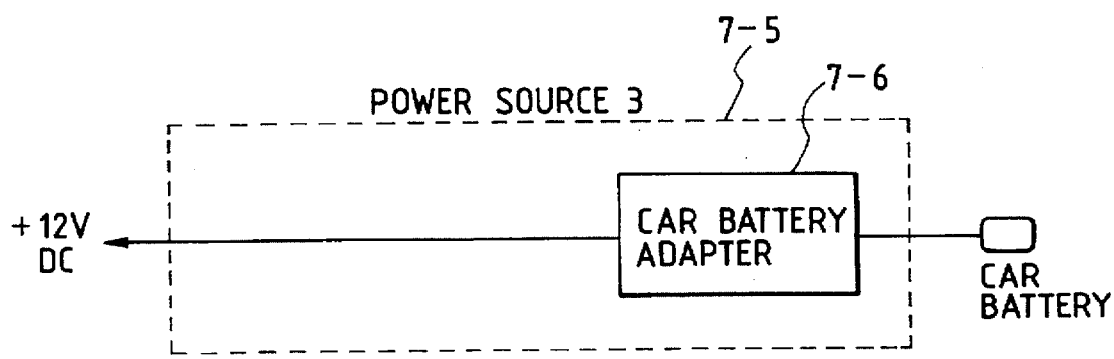

COLUMN 6
Line 26, "figure" should read --figure 6--;
Line 54, "step S52 and" should read --step S52.--;
Line 55, "display the selected mode" should read
   --The selected mode is displayed--.

COLUMN 10
Line 20, "call a" should read --a call--.

COLUMN 11
Line 9, "connection" should read --connecting--.

Signed and Sealed this

Sixteenth Day of June, 1998

Attest:

BRUCE LEHMAN

Attesting Officer        Commissioner of Patents and Trademarks